United States Patent
Tsukamoto et al.

[11] 3,776,615
[45] Dec. 4, 1973

[54] LIQUID CRYSTAL DISPLAY DEVICE

[75] Inventors: Masahide Tsukamoto, Katano-shi; Tetsuro Ohtsuka, Takatsuki-shi, both of Japan

[73] Assignee: Matsushita Electric Industrial Co. Ltd., Osaka, Japan

[22] Filed: June 2, 1972

[21] Appl. No.: 259,301

[30] Foreign Application Priority Data
June 2, 1971   Japan.............................. 46/38863

[52] U.S. Cl.......... 350/160 LC, 340/166, 340/324 R
[51] Int. Cl................................................. G02f 1/16
[58] Field of Search............................ 350/160 LC; 340/166 EL, 324 R

[56] References Cited
UNITED STATES PATENTS
3,503,673   3/1970   Heilmeier et al............. 350/160 LC
3,650,603   3/1972   Heilmeier et al............. 350/160 LC

*Primary Examiner*—Edward S. Bauer
*Attorney*—E. F. Wenderoth et al.

[57] ABSTRACT

Liquid crystal display elements formed at intersections of strip-shaped X-electrodes and Y-electrodes are actuated so as to display images. The liquid crystal mixture used consists essentially of a nematic liquid crystal having a positive dielectric anisotropy, a nematic liquid crystal having a negative dielectric anisotropy and a steroidal compound of a certain group. This liquid crystal mixture has a threshold value and is light transparent upon application of a voltage above said threshold value. Each of said X-electrodes is sequentially addressed by an addressing pulse having a pulse height of about 2V and as biased by a d.c. bias voltage bias V from a standard level and having a duration Tw, said d.c. bias voltage V being below said threshold value. A signal pulse is supplied to each of said Y-electrodes, said signal pulse having a polarity opposite to that of said addressing pulse and a duration up to Tw and being biased by a d.c. bias voltage 2V from said standard level.

7 Claims, 10 Drawing Figures

LIQUID CRYSTAL DISPLAY DEVICE

This invention relates to a liquid crystal display device, particularly to a liquid crystal display device employing an X–Y matrix method.

In liquid crystal display devices having a large number of display elements, an X–Y matrix method is known to be advantageous for reducing the number of electronic parts required. However, the conventional X–Y matrix method has several troubles. One trouble is a so-called cross effect. This cross effect is a phenomenon such that, when a voltage V is applied between a selected X-electrode and a selected Y-electrode, a half voltage V/2 undesirably appears on the display elements on said selected X- and Y-electrodes, except the display element at the intersection thereof. This cross effect reduces contrast of image very seriously. Another trouble is flicker. Since each display element is excited by pulses, flickers are likely to appear when the repetition rate of the pulses is slow. Since a response time of liquid crystals to a pulse is usually slow, a long duration and a slow repetition of pulses are required. Accordingly, it is difficult to obtain a flicker-free display device using liquid crystal.

For solving such troubles, there has been a suggestion that a diode is connected in series to each display element for removing the cross effect, and a storage element such as a capacitor is connected in parallel to each display element for removing the flicker. However, it is very difficult to fabricate a display panel having such elements because such panel is very complicated.

Accordingly, the object of the present invention is to provide a liquid crystal display device fo matrix display which is free from the troubles of cross effect and flickers.

The liquid crystal display device of the present invention comprises: a liquid crystal display panel including (1) an X-electrode member having a plurality of strip-shaped X-electrodes applied to a surface of a first plate, (2) a Y-electrode member having a plurality of strip-shaped Y-electrodes applied to a surface of a second plate, at least one of said X- and Y-electrode members being light-transparent, and (3) a liquid crystal mixture which fills the space between said X- and Y-electrode members and consists essentially of a nematic liquid crystal having positive dielectric anisotropy, a nematic liquid crystal having negative dielectric anisotropy and a steroidal compound selected from the group consisting of β-cholestanol, ergosterol, lanosterol, cholesterin and cholesterin derivatives, said liquid crystal mixture having a threshold value and being light-transparent upon application of a voltage above said threshold value, wherein said X- and Y-electrode members are opposed to each other in a manner that the direction of said X-electrodes is perpendicular to the direction of said Y-electrodes so that said X- and Y-electrodes with said liquid crystal therebetween form a plurality of display elements at the intersections thereof; a signal generator for generating image information signals; first pulse generating means coupled to said signal generator and to each of said X-electrodes, said first pulse generating means supplying an addressing pulse to said X-electrodes sequentially, said addressing pulse having a pulse height of about 2V and being biased by a d.c. voltage bias V from a standard level and having a duration Tw, said d.c. voltage bias V being below said threshold value; and second pulse generating means coupled to said signal generator and to each of said Y-electrodes, said second pulse generating means supplying a signal pulse to each of said Y-electrodes, said signal pulse having a polarity reverse to that of said addressing pulse, a pulse height substantially same as that of said addressing pulse and a duration up to Tw which is varied with a change in said image information signal, said signal pulse being biased by a d.c. voltage bias 2V from said standard level; whereby the liquid crystal mixture at each display element changes its transparency with the change in the duration of the signal pulse applied thereto so that a desired image is formed on said liquid crystal display panel.

These and other features of the present invention will be apparent upon consideration of the following descriptions taken together with the accompanying drawings, wherein.

Figure 1:
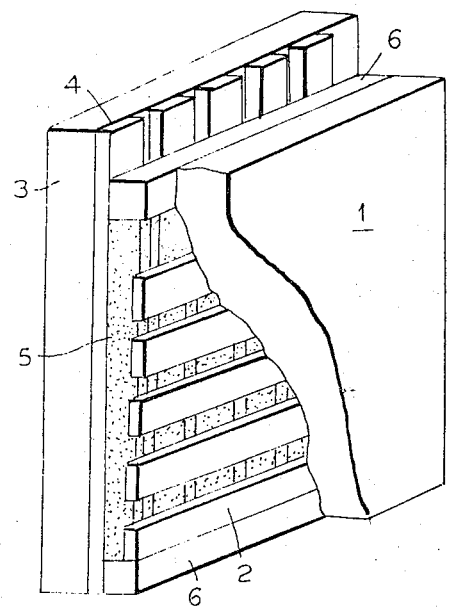
FIG. 1 is a perspective view, partially broken, of a liquid crystal display panel for matrix display of the present invention.

Referring to FIG. 1, a plurality of horizontal strip-shaped X-electrodes 2 are applied to a surface of a first plate 1. The combination of said X-electrodes and said first plate form an X-electrode member. A plurality of vertical strip-shaped Y-electrodes 4 are applied to a surface of a second plate 3. The combination of said Y-electrodes and said second plate form a Y-electrode member. Said X-electrodes 2 and said Y-electrodes 4 are opposed to each other and spaced apart by means of spacers 6 in a manner that the direction of said X-electrodes is perpendicular to the direction of said Y-electrodes. The space between said X-electrode member and said Y-electrode member is filled with a liquid crystal mixture 5. The thickness of the liquid crystal mixture layer is controlled by the thickness of said spacers 6. The liquid crystal mixture at the intersections of said X-electrodes 2 and said Y-electrodes 4 form a plurality of display elements.

The liquid crystal mixture of the present invention which will be described in detail later changes its light-scattering property or transparency when subjected to a d.c. electric field. Therefore, in practical use, there are two ways to use the liquid crystal display panel of the present invention. In one case, lights are applied to one side of the liquid crystal display panel and an observer sees the opposite side of the display panel. In this case, both the X- and Y-electrode members are required to be light-transparent. In the other case, lights are applied to one side of the liquid crystal display panel and an observer sees the same side of the display panel. In this case, the X-electrode member or Y-electrode member which corresponds to the above mentioned side of the display panel is required to be light-transparent. The electrodes of the other electrode member at the display elements are required to be light-reflective. In any case, the plates (first and second plates) should be composed of electrically insulating material as a matter of course.

The liquid crystal mixture as used in the present invention consists essentially of a nematic liquid crystal having positive dielectric anisotropy, a nematic liquid crystal having negative dielectric anisotropy and a steroidal compound selected from the group consisting of $\beta$-cholestanol, ergosterol, lanosterol, cholesterin and cholesterin derivatives. A nematic liquid crystal having positive dielectric anisotropy is a compound having its molecular dipole moment parallel to its long molecular axis. Typical compounds which represent the nematic liquid crystal having positive dielectric anisotropy are p-alkoxybenzylidene-p'-cyanoaniline, p-cyanobenzylidene-p'-alkoxyaniline, p-alkoxybenzylidene-p'-aminoazobenzene and n-alkyl-p-cyanobenzylidene-p'-aminocinnamate. Above all, p-alkoxybenzylidene-p'-cyanoaniline is most desirable because it has a large positive dielectric anisotropy and comprises nematic liquid crystals which have relatively low crystal-nematic transition temperatures, such as p-n-butoxybenzylidene-p'-cyanozniline (transition temperature: 63 °C), p-n-pentoxybenzylidene-p'-cyanoaniline (62 °C), p-n-hexoxybenzylidene-p'-cyanoaniline (55 °C), p-n-heptoxybenzylidene-p'-cyanoaniline (67 °C) and p-n-octoxybenzylidene-p'-cyanoaniline (79 °C).

A nematic liquid crystal having negative dielectric anisotropy is a compound having its molecular dipole moment perpendicular to its long molecular axis. Typical compounds which represent the nematic liquid crystal having negative dielectric anisotropy are anisalazine, p,p'-dialkoxyazoxybenzene, p-alkoxybenzylidene-p'-acyloxyaniline and p-alkoxybenzylidene-p'-alkylaniline. Above all, p-alkoxybenzylidene-p'-alkylaniline is most desirable because it has relatively small negative dielectric anisotropy and comprises nematic liquid crystals which have low crystal-nematic transition temperatures, such as p-methoxybenzylidene-p'-n-propylaniline (transition temperature: 42 °C), p-methoxybenzylidene-p'-n-butylaniline (20°C) and p-ethoxybenzylidene-p'-n-butylaniline (36 °C).

In order to obtain the required electro-optical properties of the liquid crystal mixture of the present invention which will be described later in detail, at least one of said steroidal compounds is required to be included in the liquid crystal mixture. A liquid crystal mixture consisting of a nematic liquid crystal having positive dielectric anisotropy and a steroidal compound without a nematic liquid crystal having negative dielectric anisotropy has similar electro-optical properties to those of a liquid crystal mixture of the present invention. However, such two-component liquid crystal mixture has disadvantages in that its turn-on time is slow and it is likely to be solidified when operated at a room temperature or below. On the other hand, the liquid crystal mixture of the present invention has no such disadvantages. According to the invention, not only a liquid crystal mixture consisting essentially of only one nematic liquid crystal mixture having positive dielectric anisotropy, only one nematic liquid crystal having negative dielectric anisotropy and only one steroidal compound, but also a liquid crystal mixture consisting essentially of plural nematic liquid crystals having positive dielectric anisotropy, plural nematic liquid crystals having negative dielectric anisotropy and plural steroidal compounds can be used.

Figure 2:
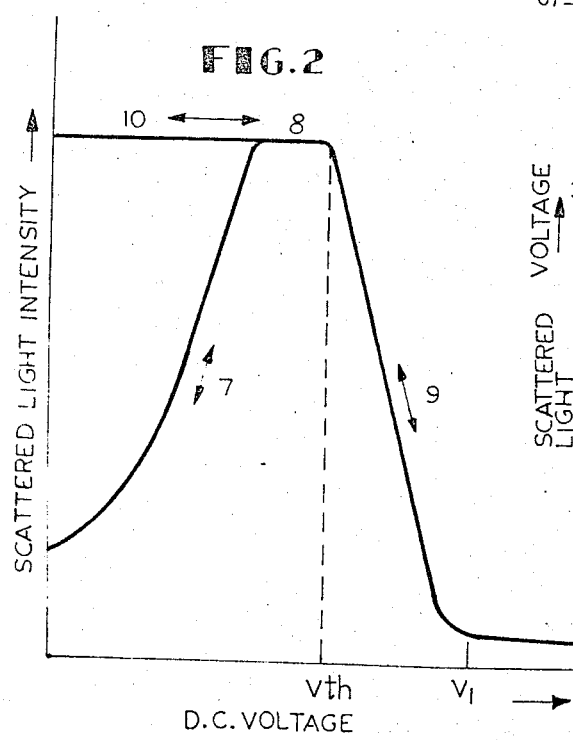
FIG. 2 is a graph showing the characteristic of the scattered light intensity vs. applied d.c. voltage of the liquid crystal mixture as used in the present invention.

FIG. 2 shows the characteristic of the scattered light intensity vs. applied d.c. voltage of the liquid crystal mixture of the present invention. Referring to FIG. 2, the liquid crystal mixture is substantially light-transparent before a d.c. electric field is applied thereto. When a d.c. voltage is applied to the liquid crystal mixture, the scattered light intensity increases as shown by the curve 7, and reaches the saturation 8. The liquid crystal mixture remains in this state, i.e., light-scattering state even when the applied d.c. voltage is reduced thereafter, as shown by the curve 10. However, a further increase in the applied d.c. voltage beyond a threshold value Vth causes a rapid decrease in the scattered light intesnity as shown by the curve 9. Then, the scattered light intensity reaches a minimum value (i.e., light-transparent state) at an applied d.c. voltage $V_1$, and the light-transparent state is kept even by further increase in the applied d.c. voltage above $V_1$. When the applied d.c. voltage is decreased from the above mentioned voltage $V_1$, the scattered light intensity increases again along the curve 9 and returns to said saturation 8. The liquid crystal mixture is substantially kept in said light-scattering state when the applied d.c. voltage is further decreased as above mentioned. After removal of the applied d.c. voltage, the liquid crystal mixture returns slowly to its initial state where the liquid crystal mixture is substantially light-transparent. The time required for the liquid crystal mixture to return to its initial state from the light-transparent state after removal of the applied d.c. voltage depends on the components of the liquid crystal mixture, thickness of the liquid crystal layer, operating temperature and so on.

Figure 3:
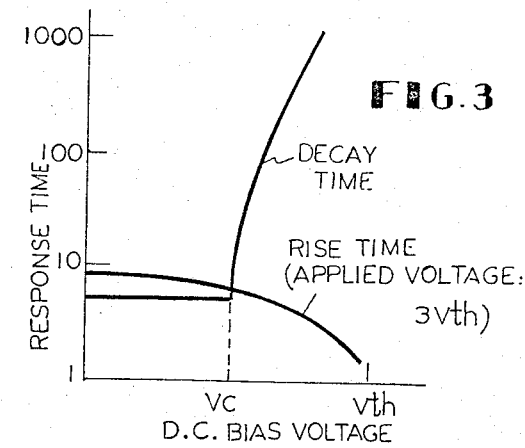
FIG. 3 is a graph showing the characteristic of the response time vs. applied d.c. bias voltage of the liquid crystal mixture as used in the present invention.

FIG. 3 shows the characteristic of the response time vs. applied d.c. bias voltage of the liquid crystal mixture of the present invention. Referring to FIG. 3, the rise time means a time interval required for the liquid crystal mixture to get to the light-transparent state from the light-scattering state upon application of a d.c. voltage above $V_1$. FIG. 3 shows the rise time when the applied d.c. voltage is suddenly increased up to 3Vth from a d.c. bias voltage. As shown in FIG. 3, the rise time becomes shorter as the value of the d.c. bias voltage is closer to the threshold value Vth. However, the bias voltage should not exceed the threshold value Vth because, if the bias voltage exceeds the threshold value Vth, the liquid crystal mixture approaches to the light-transparent state only by the d.c. bias voltage, resulting in a poorer contrast. The decay time, on the other hand, means a time interval required for the liquid crystal mixture to get to the light-scattering state from the light-transparent state when a d.c. voltage above $V_1$ is suddenly removed or decreased to the d.c. bias voltage. As clearly shown in FIG. 3, the decay time is substantially constant when the d.c. bias voltage is less than a certain value $V_c$, but the decay time increases rapidly when the bias voltage exceeds the certain value $V_c$. As a matter of course, the decay time or the rise time does not depend on the polarity of the applied voltage but depends on the absolute value of the applied voltage.

Figure 4:
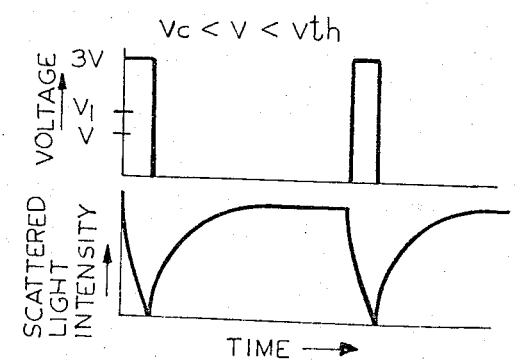
FIG. 4 is a graph showing the characteristic of the scattered light intensity vs. time of the liquid crystal mixture as used in the present invention upon application of voltage pulses.
Figure 5:
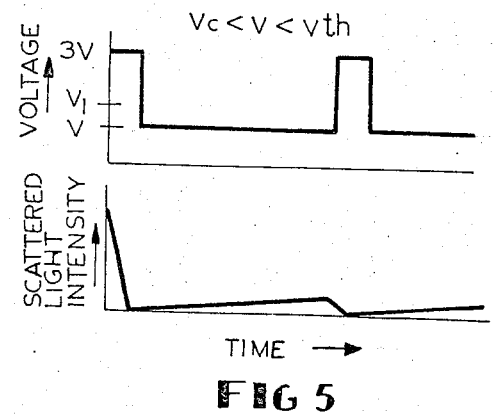
FIG. 5 is a graph showing the characteristic of the scattered light intensity vs. time of the liquid crystal mixture as used in the present invention upon application of voltage pulses biased by d.c. bias voltage.

FIG. 4 shows the characteristic of the scattered light intensity vs. time of the liquid crystal mixture upon application of voltage pulses without any d.c. bias voltage, while FIG. 5 shows the characteristic of the scattered light intensity vs. time of the liquid crystal mixture upon application of voltage pulses under existence of a d.c. bias voltage. When repeated pulses have a pulse height, e.g., 3V ($V_c<V<V_{th}$), beyond the voltage $V_1$ are applied to the liquid crystal mixture under no existence of d.c. bias voltage, the decay time is short so that the liquid crystal mixture returns to the light-scattering state before application of a succeeding pulse, as shown in FIG. 4, resulting in flicker. On the other hand, under the existence of d.c. bias voltage V, the decay time becomes very long so that the light-transparent state of the liquid crystal mixture is substantially kept until the succeeding pulse is applied thereto, as shown in FIG. 5. Therefore, flicker does not occur under the existence of d.c. bias voltage.

As apparent from the above descriptions, the liquid crystal mixture of the present invention possesses two features which make the liquid crystal mixture very advantageous for use in a matrix display. One feature is that the liquid crystal mixture of the present invention has a sharp threshold value in the characteristic of the scattered light intensity vs. applied d.c. voltage, resulting in suppression of cross effect. The other feature is that the liquid crystal mixture of the present invention has a decay time controllable electrically by a d.c. bias voltage in the range from Vc to Vth, resulting in the removal of flicker.

Figure 6:
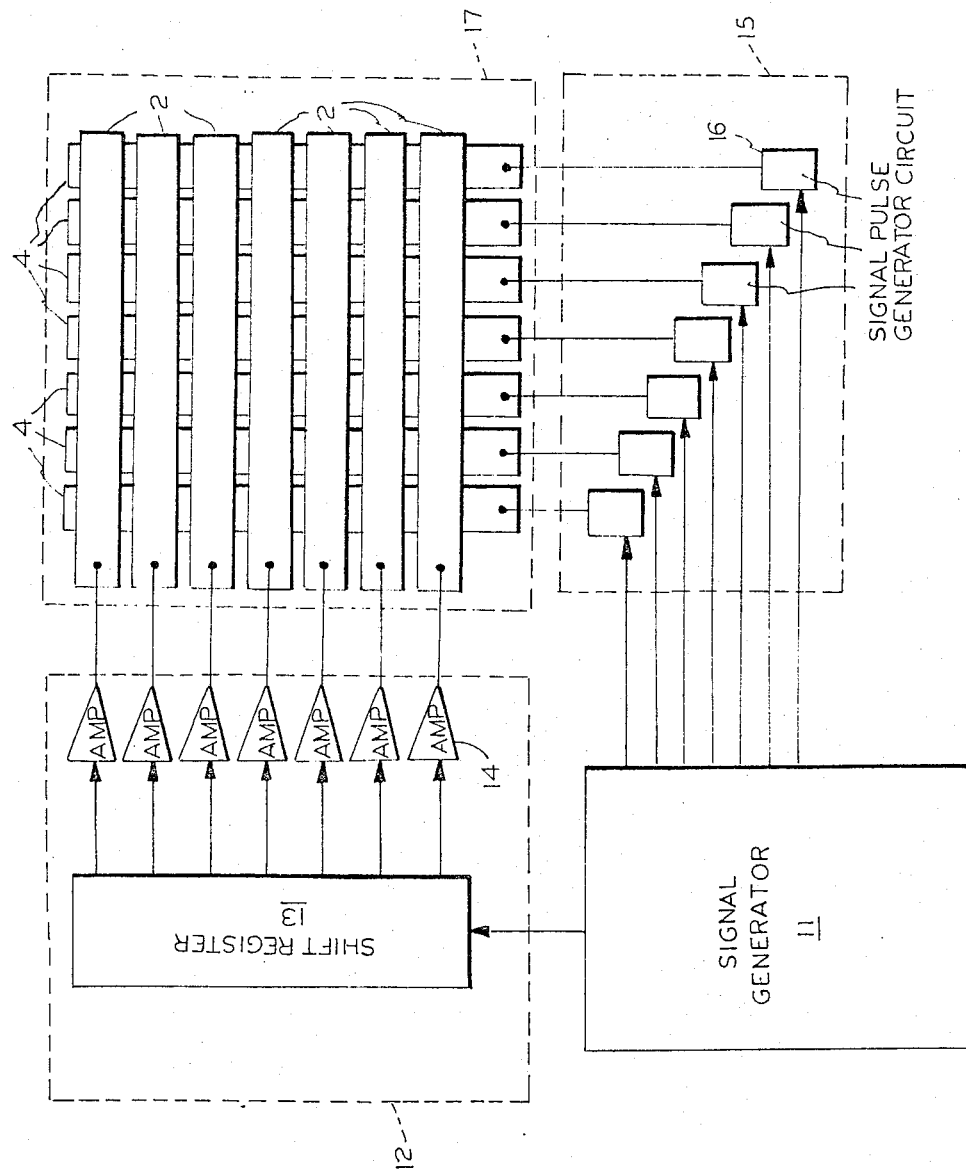
FIG. 6 is a schematic diagram, in block form, of one embodiment of the liquid crystal display device of the present invention.

FIG. 6 shows one embodiment of the liquid crystal display device of the present invention. Referring to FIG. 6, a signal generator 11 generates image information signals which are required for producing images on the liquid crystal display panel 17. The image information signals include signals to control addressing pulses for X-electrodes 2 and signal pulses for Y-electrodes 4. Reference numeral 12 designates first pulse generating means. This first pulse generating means 12 consists of shift-register 13 and amplifiers 14 which are connected to output terminals of said shift-register 13, respectively. The shift-register 13 is controlled by said signal generator 11. The shift-register 13 generates only one output signal having high level which moves through the output terminals of the shift-register 13 sequentially, one by one. Each amplifier 14 generates an addressing pulse having a pulse height of about 2V, and a duration Tw and being biased by a d.c. voltage bias V from a standard level, when the output signal from the shift-register 13 has high level. For said standard level, the earth level is convenient to design the circuit of the display device. However, any other level can be also used for the standard level. According to FIG. 6, the first pulse generating means 12 consists of the shift-register 13 and plural amplifiers 14. However, any other arrangements can be also used so long as the arrangements generate such addressing pulses as above mentioned.

Second pulse generating means 15 consists of a plurality of signal pulse generating circuits 16 for Y-electrodes 4. Each signal pulse generating circuit 16 generates a signal pulse having a polarity reverse to that of said addressing pulse, a pulse height substantially same as that of the addressing pulse and a duration up to Tw which is varied with a change in the information signal from the signal generator 11, and being biased by a d.c. voltage bias 2V from the standard level. Said signal generator 11 is coupled to said first pulse generating means 12 in a manner that said signal pulses and said addressing pulse are synchronized with each other.

The liquid crystal mixture at each display element which is formed at each intersection of said X-electrodes 2 and said Y-electrodes 4 changes its transparency corresponding to the duration of the signal pulse applied to Y-electrodes so that a desired image is formed on the liquid crystal panel because there occur differences in transparency among display elements. Details of forming images will be described later.

Figure 7:
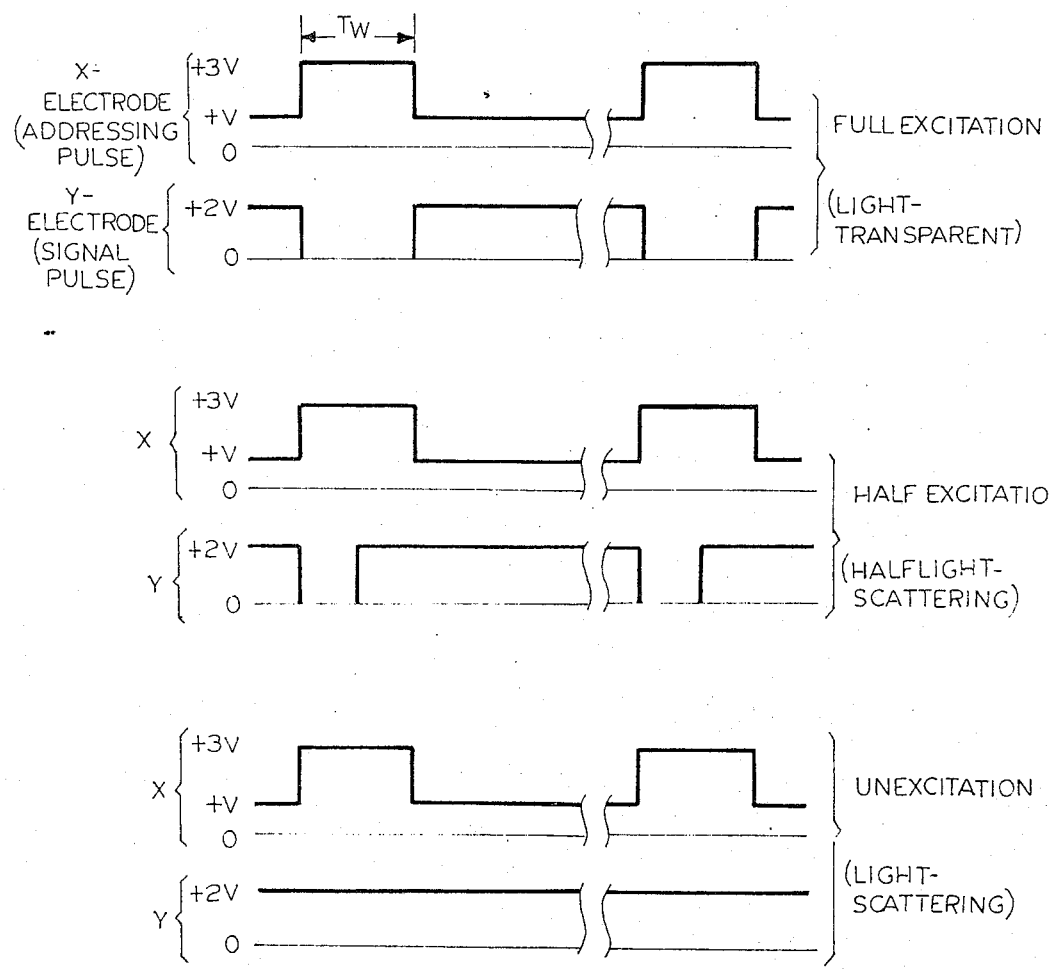
FIG. 7 is a graph showing addressing pulses applied to each of the X-electrodes and signal pulses applied to each of the Y-electrodes of the liquid crystal display panel of the present invention.

FIG. 7 shows examples of an addressing pulse applied to an X-electrode and signal pulses applied to a Y-electrode. An addressing pulse applied to an X-electrode has a pulse height 2V and a duration Tw and is biased by a d.c. bias voltage V. The duration of the addressing pulse is determined by the rise time of the employed liquid crystal mixture as described before with reference to FIG. 3, and is usually nearly equal to or longer than the rise time. However, shorter duration than the rise time may be employed, since the decay time becomes longer as shown in FIG. 3, so that a few repeated pulses having a duration shorter than the rise time can excite the liquid crystal mixture completely to the light-transparent state. In this case, the time interval between two adjacent pulses is required to be shorter than the time interval required for the liquid crystal mixture to get to the light-scattering state.

The signal pulse applied to a Y-electrode has a pulse height −2V and a duration from 0 to Tw (i.e., up to Tw) and is biased by a d.c. bias voltage 2V. Said duration from 0 to Tw is varied with the change in the image information signal from the signal generator 11. Said change in the image information signal includes a change of the image information signal in its amplitude, frequency, pulse duration, number of pulses and so on. Usually, it is preferable to use a change in amplitude of the image information signal for changing the duration of the signal pulse. If the image information signal which is synchronized with the addressing pluse is such a signal that it brings the liquid crystal mixture to the light-transparent state in cooperation with the addressing pulse, such image information signal can be called a "full excitation" signal. In the case when the image information signal is a full excitation signal, the signal pulse has a full duration Tw as shown in the upper graph of FIG. 7. If the image information signal is such a signal that it brings the liquid crystal mixture to a half light-transparent state or half light-scattering state, such image information signal can be called a "half excitation" signal. In the case when the image information signal is a half excitation signal, the signal pulse has a duration less than $Tw$ as shown in the middle graph of FIG. 7. If the image information signal is such a signal that it brings the liquid crystal mixture to the light-scattering state, such image information signal can be called "unexcitation" signal. In the case when the image information signal is an unexcitation signal, the signal pulse has a duration 0, that is, there exists no signal pulse, as shown in the lower graph of FIG. 7.

In order to display characters by using the display device of the present invention, only full excitation and unexcitation image information signals are required. In this case, each of said signal pulse generating circuits 16 may simply be an amplifier if the image information signals are amplitude-modulated signals. In order to display an image which requires half tone, the half excitation image information signals are also required. In this case, each of said signal pulse generating circuit 16 should include not only an amplifier but also a converter which converts the image information signal to a duration of pulse.

Figure 9:
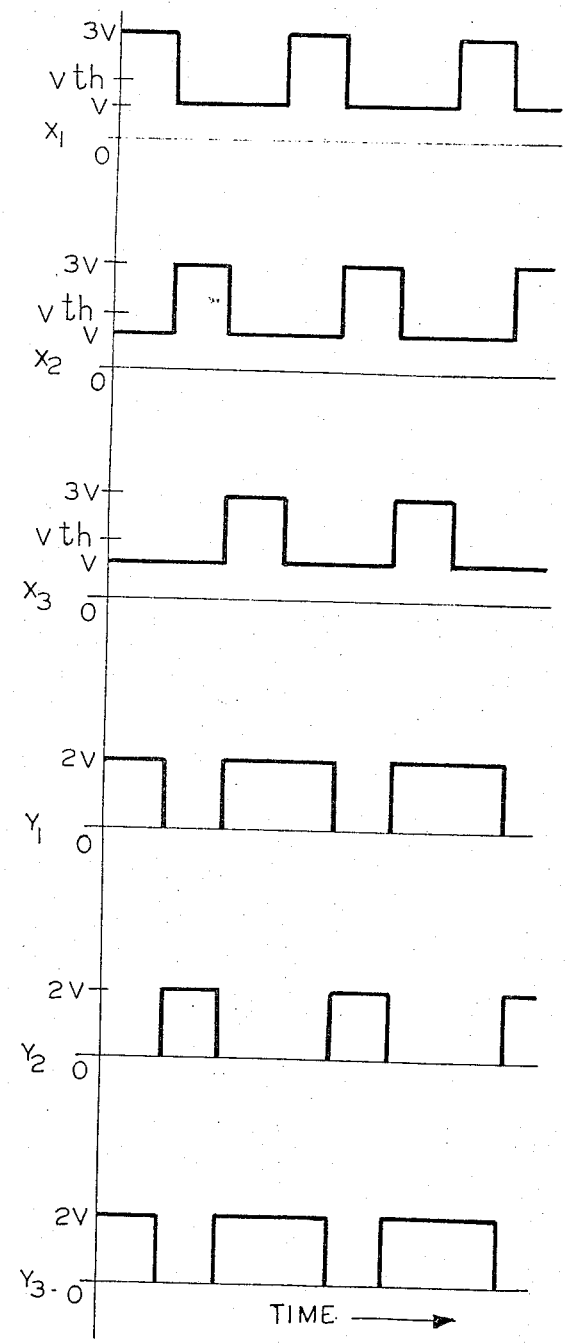
FIG. 9 is a graph showing the addressing pulses applied to the X-electrodes and signal pulses applied to the Y-electrodes of the portion of the display panel as shown in FIG. 8.

The operation of the liquid crystal display device of the present invention for displaying characters will be described in more detail hereinafter with reference to FIGS. 8, 9 and 10.

Figure 8:
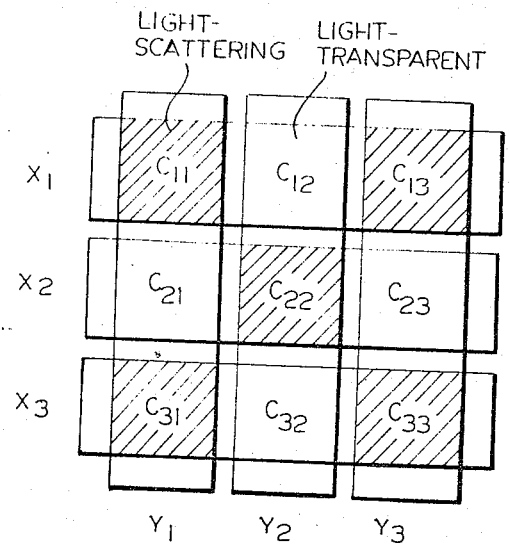
FIG. 8 is a drawing showing an example of images displayed on 9 display elements in the liquid crystal display panel of the present invention.

For the sake of convenience, only three X-electrodes and three Y-electrodes are shown in FIG. 8. The three X-electrodes $X_1$, $X_2$ and $X_3$ and the three Y-electrodes $Y_1$, $Y_2$ and $Y_3$ make nine display elements $C_{11}$, $C_{12}$, $C_{13}$, $C_{21}$, . . ., $C_{33}$. In this example, a line-at-a-time addressing method is employed. In FIG. 8, an exemplary pattern is shown, where the shaded display elements $C_{11}$, $C_{13}$, $C_{22}$, $C_{31}$ and $C_{33}$ are not excited or in the light-scattering state or opaque. The other display elements are excited and light-transparent. An addressing pulse which has a pulse height 2V and a duration Tw and is biased by a d.c. bias voltage V below and near the threshold value Vth of the liquid crystal mixture as shown in FIG. 9 is applied to the X-electrode $X_1$ by means of a first pulse generating means. Synchronously with the addressing pulse, signal pulses which correspond to the display elements on the X-electrode $X_1$ are applied to the Y-electrodes $Y_1$, $Y_2$ and $Y_3$ by means of a second pulse generating means. The bias voltage biasing the signal pulse is 2V. The pulse height of the signal pulse is $-2V$. The duration of the signal pulse is $Tw$ in the case of an unexcitation image information signal and 0 in the case of a full excitation of image information signal. After the addressing of the X-electrode $X_1$ is finished, the next X-electrode $X_2$ is addressed. Then, synchronized signal pulses corresponding to the display elements on the X-electrode $X_2$ are applied to the Y-electrodes in the same manner as described above. The same process is performed for the display elements on the X-electrode $X_3$ also. These processes are repeated. The relation in time between the addressing and signal pulses are shown in FIG. 9.

Figure 10:
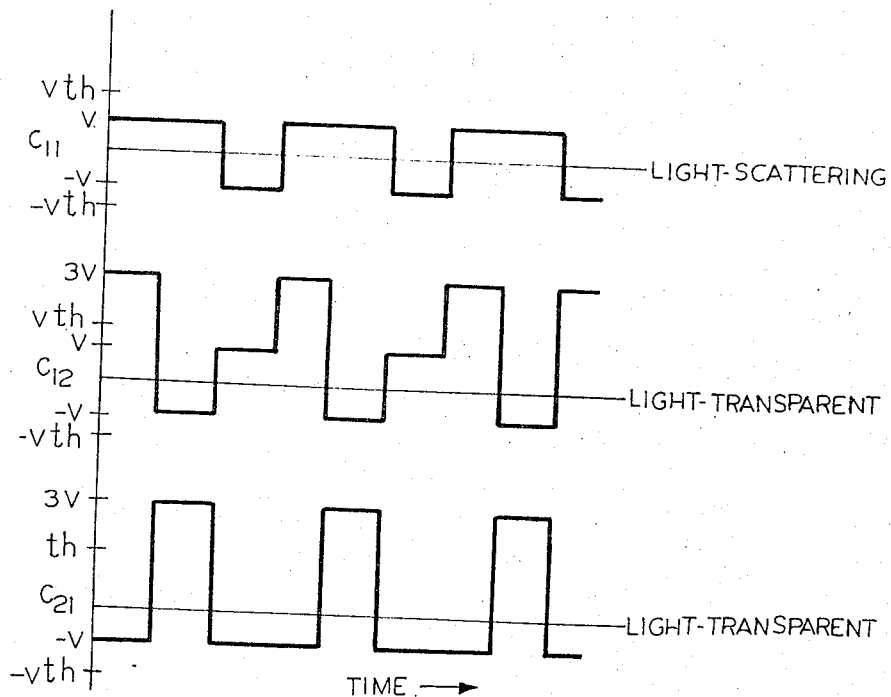
FIG. 10 is a graph showing the resultant pulses produced by superposing the addressing and signal pulses as shown in FIG. 9 in order to make the image as shown in FIG. 8.

The pulse forms of the resultant pulses which are obtained by the addressing pulses and signal pulses and are applied to the display elements $C_{11}$, $C_{12}$ and $C_{21}$ are shown in FIG. 10. Since the voltage applied to the display element $C_{11}$ does not exceed the threshold value Vth, this display element is in the light-scattering state and opaque. This is also the smame with the display elements $C_{13}$, $C_{22}$, $C_{31}$ and $C_{33}$. On the other hand, the display elements $C_{12}$ and $C_{21}$ are in the light-transparent state and light-transparent, because the voltages applied to the display elements $C_{12}$ and $C_{21}$ exceed the threshold value Vth, and the decay time of the liquid crystal mixture is prolonged by a d.c. bias voltage below and near the threshold value Vth and does not depend on the polarity of the d.c. bias voltage. This is also the same with the display elements $C_{23}$ and $C_{32}$.

In the case of displaying general images including half tone, signal pulses having a duration from 0 to $Tw$ are required as described above with reference to FIG. 7. The duration $Tw$ is desirable almost equal to the rise time so that signal pulses having a duration less than $Tw$ cannot bring the liquid crystal mixture to a complete light-transparent state.

An element-at-a-time addressing method can be also employed to the present invention. In this case, only one display element in the display panel is excited at a time, instead of one line.

In practical use, the number of the display elements may be much more than that of the above mentioned example.

The liquid crystal display panel described hereinbefore is a matrix type panel having strip-shaped X- and Y-electrodes. However, it is easily understood that another shape of electrodes can be used for forming different shape of display elements for displaying variety of desired image patterns. For example, a well known 7-segment alpha-numeric display panel can be made without departing from the scope of the present invention.

As described hereinbefore, the present invention provides a novel liquid crystal display device which is free from any cross effect and flickers, producing clear and high contrast images.

What we claim is:

1. A liquid crystal display device comprising:
a liquid crystal display panel including (1) an X-electrode member having a plurality of strip-shaped X-electrodes applied to a surface of a first plate, (2) a Y-electrode member having a plurality of strip-shaped Y-electrodes applied to a surface of a second plate, at least one of said X- and Y-electrode members being light-transparent, and (3) a liquid crystal mixture which fills the space between said X- and Y-electrode members and consists essentially of a nematic liquid crystal having positive dielectric anisotropy, a nematic liquid crystal having negative dielectric anisotropy and a steroidal compound selected from the group consisting of β-cholestanol, ergosterol, lanosterol, cholesterin and cholesterin derivatives, said liquid crystal mixture having a threshold value and being light-transparent upon application of a voltage above said threshold value, wherein said X- and Y-electrode members are opposed to each other in a manner that the direction of said X-electrodes is perpendicular to the direction of said Y-electrodes so that said X- and Y-electrodes with said liquid crystal therebetween form a plurality of display elements at the intersections thereof;
a signal generator for generating image information signals;
first pulse generating means coupled to said signal generator and to each of said X-electrodes, said first pulse generating means supplying an addressing pulse to said X-electrodes sequentially, said addressing pulse having a pulse height of about 2V and being biased by a d.c. voltage bias V from a standard level and having a duration T$w$, said d.c. voltage bias V being below said threshold value; and second pulse generating means coupled to said signal generator and to each of said Y-electrodes, said second pulse generating means supplying a signal pulse to each of said Y-electrodes, said signal pulse having a polarity reverse to that of said addressing pulse, a pulse height substantially same as that of said addressing pulse and a duration up to Tw which is varied with a change in said image information signal, said signal pulse being biased by a d.c. voltage bias 2V from said standard level;

whereby the liquid crystal mixture at each display element changes its transparency with the change in the duration of the signal pulse applied thereto so that a desired image is formed on said liquid crystal display panel.

2. A liquid crystal display device as claimed in claim 1, wherein both of said X- and Y-electrode members are light-transparent.

3. A liquid crystal display device as claimed in claim 1, wherein said X-electrodes are light-reflective.

4. A liquid crystal display device as claimed in claim 1, wherein said standard level is earth level.

5. A liquid crystal display device as claimed in claim 1, wherein said nematic liquid crystal having positive dielectric anisotropy is a compound selected from the group consisting of p-alkoxybenzylidene-p'-cyanoaniline, p-cyanobenzylidene-p'-alkoxyaniline, p-alkoxybenzylidene-p'-aminoazobenzene and n-alkyl-p-cyanobenzylidene-p'-aminocinnamate.

6. A liqiud crystal display device as claimed in claim 1, wherein said nematic liquid crystal having negative dielectric anisotropy is a compound selected from the group consisting of anisalazine, p, p'-dialkozyazoxybenzene, p-alkoxybenzylidene-p'-acyloxyaniline and p-alkoxybenzylidene-p'-alkylaniline.

7. A liquid crystal display device as claimed in claim 1, wherein said liquid crystal mixture comprises a p-alkoxybenzylidene-p'-cyanoaniline, a p-alkoxybenzylidene-p'-alkylaniline and a cholesterin derivative.

* * * * *